3,412,177
INTERPOLYMERIZATION OF ACRYLONITRILE MONOMER AND POLYMER AT AN ELEVATED PRESSURE

Russell K. Griffith, Chagrin Falls, Ohio, assignor to The Standard Oil Company, Cleveland, Ohio, a corporation of Ohio
No Drawing. Filed Feb. 28, 1966, Ser. No. 530,408
4 Claims. (Cl. 260—881)

ABSTRACT OF THE DISCLOSURE

Void-free, 3-dimensional solid articles can be prepared by a process consisting of heating a consolidated polymerizable mixture comprising acrylonitrile monomer and an acrylonitrile polymer at a temperature of from about 50° C. to about 300° C. at a pressure of at least 1000 p.s.i.g. in as short a time as a minute or less up to a maximum of about two hours or more.

---

The present invention is concerned with the bulk polymerization of acrylonitrile in the presence of an acrylonitrile polymer and more particularly relates to a process for the production of articles composed of acrylonitrile polymers comprising polymerizing a mixture comprising acrylonitrile monomer and an acrylonitrile polymer at an elevated pressure.

Acrylonitrile polymers have many excellent physical and chemical properties which are highly desirable in shaped articles; however, these polymers have had to be formed by other than conventional means heretofore. The failure of many acrylonitrile polymers to respond to conventional thermoforming techniques is decidedly disadvantageous and could very well be the reason why shaped articles based on acrylonitrile polymers, other than fibers which are ordinarily spun from solutions, are not widely available for use in commerce.

Most previous attempts to subject acrylontrile to bulk polymerization reported in the literature have produced at least in part opaque, powdery, flocculate or agglomerated precipitates of polyacrylonitrile. The products so obtained are similar to those obtained by polymerization of acrylonitrile in a liquid medium, e.g., water. It is known that liquid acrylonitrile free of inhibitors and in the presence of a suitable polymerization initiator will polymerize quite rapidly. Because of this tendency toward rapid polymerization, the bulk polymerization of acrylonitrile is most difficult to control and often results in a very rapid and sometimes explosive reaction. In this regard see Journal of Polymer Science, vol. 13, pages 329–353 (1954) and the textbook "Vinyl and Related Polymers" by C. A. Schildknecht, pp. 264–265.

Previously known polyacrylonitrile prepared either in bulk or in a liquid medium was generally a white or yellowish opaque powder. It is well known that polyacrylonitrile powder can be processed into fibers or films from a polar solvent by spinning or other wet processes. Attempts to mold polyacrylonitrile powder by fusion into void-free, three-dimensional bodies have not previously been successful, primarily because the high temperatures required for molding are in the same range as the temperature of decomposition of the polymer. (The textbook "Fibers, Plastics and Rubbers" by W. J. Roff, Butterworths, 1956, London, states at page 186 in reference to polyacrylonitrile that "the polymer softens with charring and decomposition at 270° C.").

The production of solid, partially transparent bodies of polyacrylonitrile by a special bulk polymerization procedure has been described in British Patent No. 964,533. In this prior art process a mixture of acrylonitrile monomer and acrylonitrile polymer containing certain polymerization initiators and promoters and optionally additives such as plasticizers, fillers, reinforcing agents and heat and radiation stabilizers are left to stand at a temperature not exceeding 60° C. until a clear polyacrylonitrile forms which is still in contact with unpolymerized acrylonitrile monomer. This prior art process requires long reaction periods of at least fourteen hours up to a month or more and obviously is not attractive from a commercial production standpoint, because in addition to the lengthy reaction period, some opaque polymer forms which must be removed from the clear polymer. Thus, the process of British Patent No. 964,533 always produces the desired bulk acrylonitrile polymer mass along with the unwanted opaque acrylonitrile polymer and unreacted monomer.

I have discovered a novel, rapid process for preparing solid bodies comprising polyacrylonitrile which contain substantially no unpolymerized monomer or unwanted opaque polymer, said process comprising heating a compacted polymerizable mixture comprising acrylonitrile monomer and an acrylonitrile polymer at a temperature of from about 50° C. to about 300° C. at a pressure of at least about 1,000 p.s.i.g. More preferably, my process is carried out at a temperature of from about 70° C. to 250° C. and at a pressure of at least 2,000 p.s.i.g. in the substantial absence of gaseous material. My process produces substantially void-free finished articles substantially free of any monomer in as short a time as a minute or less up to a maximum of about two hours or more. Although it is possible to thermally polymerize the acrylonitrile monomer, in my process it is often advantageous to add to the polymerization mixture a small amount of polymerization initiator or the polymerization may be initiated by radiation such as by ultra violet radiation, nuclear radiation or by X-rays, etc.

The acrylonitrile polymers useful as components of the polymerizable mixtures in the present invention are those composed of a major amount of acrylonitrile. Preferred are acrylonitrile homopolymers and copolymers prepared from monomer mixtures of at least 70% by weight of acrylonitrile and up to 30% by weight of at least one other monomer copolymerizable with acrylonitrile. The other monomer copolymerizable with acrylonitrile can be either a monoalkenyl or a polyalkenyl monomer. The most preferred acrylonitrile polymer in the present invention is acrylonitrile homopolymer.

Useful monoalkenyl monomers include acrylic acid and the acrylate esters such as methyl acrylate, ethyl acrylate, the propyl acrylates, the butyl acrylates, the amyl acrylates, the hexyl acrylates, cyclohexyl acrylate, phenyl acrylate, the octyl acrylates and the like; methacrylic acid and the methacrylate esters such as methyl methacrylate, ethyl methacrylate, the propyl methacrylates, the butyl methacrylates, the amyl methacrylates, the hexyl methacrylates, cyclohexyl methacrylate, phenyl methacrylate, the decyl methacrylates and the like; vinyl esters such as vinyl acetate, vinyl propionate, the vinyl butyrates, vinyl benzoate, isopropenyl acetate, and the like; the vinyl aromatics such as styrene, alphamethyl styrene, vinyl toluene, the vinyl xylenes, the vinyl naphthalenes, isopropenyl benzene and the like; maleic acid, fumaric acid, itaconic acid, maleic anhydride and esters such as dimethyl maleate, dimethyl fumarate, diethyl maleate, diethyl itaconate, and the like; vinyl amides such as acrylamide, methacrylamide, N-methyl acrylamide, N-methylolacrylamide, vinyl benzamide, N-vinyl pyrrolidone and the like; the vinyl halides, such as vinyl chloride, vinyl bromide, vinyl fluoride, vinylidene fluoride, dichloro difluoro ethylene, tetra-fluoroethylene and the like; olefins such as ethylene, propylene, isobutylene, butene-1 and the like; vinyl amines such as the vinyl pyridines, allyl amine, methallyl amines and others.

Useful polyalkenyl monomers include those having at least two vinyl groups per molecule such as allyl acrylate, allyl methacrylate, diallyl maleate, diallyl fumarate, ethylene glycol dimaleate, diallyl itaconate, methallyl acrylate, divinyl ether, diallyl ether, dimethallyl ether, ethylene glycol dimethacrylate, 1,1,1-trimethoxypropane-dimethacrylate, glyceryl triacrylate, sucrose hexaacrylate, diallyl phthalate, triallyl cyanurate, 2,2,5,5-tetramethyl-1,5-hexadiene, 1,5-hexadiene, 1,6-heptadiene, 1,7-octadiene, 1,8-nonadiene, divinyl biphenyl, divinyl naphthalene, divinyl benzene, trivinyl benzene, diallyl benzene, diisopropenyl benzene, allyl allyloxyacetate, ethylidene dimethacrylate, methylene dimethacrylate, diallyl melamine, diallyl isomelamine, triallyl melamine, triallyl aconitate, triallyl phosphate, tetraallyl silane, tetravinyl silane, diallyl divinyl silane, tetraallyl germane, tetravinyl tin, tetravinyl germane, triacryloyl perhydrotriazine, trimethacryloyl perhydrotriazine, divinyl spirobi, methylene-bis-acrylamide, ethylene diacrylamide, N-allyl acrylamide, N,N-diallyl acrylamide, N,N-dimethallyl acrylamide, polyallyl ethers of polyhydric alcohols such as tetraalkyl pentaerythritol, hexaallyl sucrose, hexaallyl inositol, hexaallyl sorbitol, hexavinyl sucrose and the like and others.

The acrylonitrile polymers useful in the polymerizable mixtures of this invention may be prepared in any convenient manner such as by batch, bulk, solution, emulsion or suspension polymerization techniques, all of which are well known to those skilled in the art. For best results, however, it is preferred that the acrylonitrile polymers be prepared in an aqueous medium in the presence of a polymerization initiator. The polymerization reaction may be carried out by adding all of the monomer to the reaction mixture at once or in increments or in a continuous manner during the course of the reaction. A suitable emulsifier, surface active agent or dispersing agent is preferably used during the polymerization procedure in the preparation of the acrylonitrile polymers useful in this invention.

The acrylonitrile polymers embodied herein are resinous polymers usually having molecular weights of from about 10,000 to 1,000,000 or more.

The polymerizable mixtures of the present invention can include, in addition to the required acrylonitrile monomer and acrylonitrile polymer, small amounts of one or more other polymers, dyes, lubricants, antistatic agents, reinforcing agents, stabilizers, pigments, fillers, monomers, and the like including such materials as glass fibers, polyester fibers, polyacrylonitrile fibers, asbestos, steel wool, silica, alumina, titania, zirconia, Carborundum, polyvinyl pyrrolidone, vinylidene chloride, divinyl benzene and the like.

Polymerization initiators useful in this process include peroxide initiators, hydroperoxide initiators, azo initiators and redox type initiators. The catalyst, when employed, is most useful in the range of from 0.01 to 10 parts per 100 parts of acrylonitrile monomer in the mixture.

The acrylonitrile monomer is preferably present in the polymerizable mixtures of this invention in from about 20 to 500 parts by weight per 100 parts by weight of acrylonitrile polymer.

The articles of the present invention are preferably prepared in situ in a mold by compression molding, injection molding, extrusion and similar techniques. In this respect the present invention differs markedly from that described in British Patent No. 954,533 because the latter process is much too slow for conducting directly in molds and the patent states that the polymer may first be obtained as an unshaped body which may in turn be mechanically processed, e.g., by a grinding, cutting or the like operation. It is preferred in the process of my invention that the pressure applied to the polymerizable mixture be direct mechanical pressure applied to a consolidated mass, essentially void-free, of the polymerizable mixture. This is conveniently accomplished by compression molding, injection molding, extruding with either a screw type or plunger type of extruder and the like.

The articles produced by the instant process are useful in the production of various tools, handles, knobs, electrical insulators, and the like. The products of the present invention which are prepared without the presence of opaque fillers or pigments are transparent and are of particular interest as they have been found to be applicable in optics because of their high softening point, resistance to solvents and good scratch resistance.

In the following examples, which will further illustrate my invention, the amounts of the various ingredients are given in parts by weight unless otherwise indicated.

Example I

An acrylonitrile copolymer was prepared from the following recipe:

| | Parts |
|---|---|
| (a) Water | 400 |
| (b) Emulsifier (GAFAC RE-610)[1] | 3.5 |
| (c) Ammonium persulfate | 0.5 |
| (d) Potassium metabisulfite | 0.23 |
| (e) t-Dodecyl mercaptan | 0.7 |
| (f) Acrylonitrile | 1.76 |
| (g) Butanediol-1,4-divinyl ether | 0.34 |
| (h) Acrylonitrile | 97.9 |

[1] A mixture of $R-O-(CH_2CH_2O)_nPO_3M_2$ and $[R-O-(CH_2CH_2O-)_n]_2PO_2M$ wherein $n$ is a number of from 1 to 40, R is an alkyl or alkaryl group and preferably a nonyl phenyl group and M is hydrogen, ammonia or an alkali metal, which composition is sold by the General Aniline and Film Corp.

Ingredients (a) and (e) were charged into a reactor and the temperature was brought to 50° C. with stirring. A nitrogen atmosphere was maintained in the reaction vessel. Ingredients (f) and (g) were added and polymerization of these two monomers was substantially completed in about a 90 minute period. Then the ingredient (h) was added continuously over a 195 minute period while the reaction mixture was maintained at 50° C. and the resulting polymer dispersion was stirred and heated at 50° C. for an additional three hours. The final product was a suspension of polymer in water from which the polymer was readily isolated by filtration. The isolated polymer was washed on the filter and dried in an oven. A polymerizable mixture was prepared as follows:

Six parts of the acrylonitrile polymer described above were mixed with a solution of 0.05 part of azobisisobutyronitrile in 6.5 parts of acrylonitrile to form a powdery mixture. The mixture was placed in a compression mold made up of a converter and a plunger. The mold cavity was 5 inches long, ½ inch thick and several inches deep. The mold was equipped with a thermocouple. The mold was closed and placed between the platens of a press and the mixture was compressed at a pressure of 6,000 p.s.i.g. The mold was heated from room temperature to a temperature of 74° C. within 15 minutes. The mold was then cooled to room temperature, the pressure was released and the clear molded bar which resulted, having the dimensions of 5" x ½" x ¼", was found to have a heat distortion temperature of 77° C., a flexural strength of $6.0 \times 10^3$ p.s.i., a flexural modulus of $4.9 \times 10^5$ p.s.i., a tensile strength of $3.0 \times 10^3$ p.s.i., a notched Izod of 0.13 foot pound per inch of notch and a Rockwell hardness of 102.

Example II

The procedure of Example I was repeated except that the ultimate mold temperature was 78° C. and the molding time was 30 minutes. The resulting molded bar had a heat distortion temperature of 80° C., a flexural strength of $5.8 \times 10^3$ p.s.i., a flexural modulus of $6.5 \times 10^5$ p.s.i., a tensile strength of $4.0 \times 10^3$ p.s.i., and a Rockwell hardness of 102.

Example III

The procedure of Example II was followed with the exception that 7 parts by weight of the acrylonitrile polymer and 0.1 part by weight of azobisisobutyronitrile and a final mold temperature of 104° C. were employed. The molded bar had a heat distortion temperature of 90° C., a flexural strength of $6.1 \times 10^3$ p.s.i., a flexural modulus of $6.3 \times 10^5$ p.s.i., a tensile strength of $3.2 \times 10^3$ p.s.i., and a Rockwell hardness of 109.

Example IV

The procedure of Example I was repeated using 3.2 parts by weight of acrylonitrile, a final mold temperature of 133° C. and a molding time of 24 minutes. The molded, transparent bar was found to have a heat distortion temperature of 87° C., a flexural strength of $4.5 \times 10^3$ p.s.i., a tensile strength of $5.7 \times 10^3$ p.s.i., a notched Izod of 0.14 foot pound per inch of notch, and a Rockwell hardness of 107.

Example V

The procedure of Example IV was repeated except that a final mold temperature of 138° C. and a molding time of 60 minutes in the mold were used. The resulting transparent bar was found to have a heat distortion temperature of 84° C., a flexural strength of $3.6 \times 10^3$ p.s.i., a flexural modulus of $5.8 \times 10^5$ p.s.i., a tensile strength of $6.0 \times 10^3$ p.s.i., and a Rockwell hardness of 108.

Example VI

The procedure of Example V was repeated except that 5 parts by weight of acrylonitrile polymer, 4.8 parts by weight of acrylonitrile and 1 part by weight of granular polyvinyl chloride were included in the mixture. The final mold temperature was 117° C., and the molding time was 25 minutes. The resulting bar was found to have a heat distortion temperature of 83° C., a flexural strength of $4.9 \times 10^3$ p.s.i., a flexural modulus of $5.5 \times 10^5$ p.s.i., a tensile strength of $5.9 \times 10^3$ p.s.i., and a Rockwell hardness of 104.

Example VII

The procedure of Example V was repeated except that 1 part by weight of fuller's earth was included in the polymerizable mixture. A final mold temperature of 139° C., and a molding time of 30 minutes were employed. The bar produced was found to have a heat distortion temperature of 82° C., a flexural strength of $5.21 \times 10^3$ p.s.i., a flexural modulus of $6.6 \times 10^5$ p.s.i., a tensile strength of $4.8 \times 10^3$ p.s.i., and a Rockwell hardness of 103.

Example VIII

The procedure of Example VII was repeated using only 1.6 parts by weight of acrylonitrile and 2.4 parts by weight of vinylidene chloride in place of the fuller's earth. A final mold temperature of 148° C. and a molding time of 30 minutes were employed. The molded bar was found to have a heat distortion temperature of 80° C., a flexural strength of $6.1 \times 10^3$ p.s.i., a flexural modulus of $6.5 \times 10^5$ p.s.i., a tensile strength of $5.18 \times 10^3$ p.s.i., a notched Izod of 0.14 foot pound per inch of notch, and a Rockwell hardness of 106.

Example IX

The procedure of Example V was repeated with the exception that 0.32 part by weight of chopped glass fiber having an average length of about ¼ inch was included in the polymerizable mixture. A final mold temperature of 142° C. and a molding time of 30 minutes were employed. The resulting opaque bar was found to have a heat distortion temperature of 81° C., a flexural strength of $6.1 \times 10^3$ p.s.i., a flexural modulus of $7.2 \times 10^5$ p.s.i., a tensile strength of $2.6 \times 10^3$ p.s.i., a notched Izod of 0.65 foot pound per inch of notch and a Rockwell hardness of 112.

When the above procedure was repeated using 1.06 parts by weight of chopped glass, a notched Izod strength of 3.03 foot pounds per inch of notch was obtained.

Example X

The procedure of Example IX was repeated except that 0.67 part by weight of steel wool was used in place of the glass fiber. A final mold temperature of 149° C. and a molding time of 30 minutes were employed. The opaque bar which resulted was found to have a heat distortion temperature of 79° C., a flexural strength of $5.2 \times 10^3$ p.s.i., a flexural modulus of $6.0 \times 10^5$ p.s.i., a tensile strength of $4.3 \times 10^3$ p.s.i., a notched Izod of 0.15 foot pound per inch of notch and a Rockwell hardness of 108.

Example XI

Six parts of the acrylonitrile polymer described in Example IV were mixed with 4.1 parts of azobisisobutyronitrile saturated acrylonitrile. The mixture was placed in the cavity of a compression mold equipped with a thermocouple. The mold was closed and placed between the platens of a preheated press and compressed at a pressure of 6,000 p.s.i.g. and a temperature of 60° C. for 30 minutes. The mold was removed from the press and cooled. The bar obtained was translucent and comparable in properties with the molded bar prepared according to the procedure of Example IV.

Example XII

Six parts of acrylonitrile polymer were mixed with four parts of distilled acrylonitrile and no polymerization initiator. The powder was subjected to a pressure of 6,000 p.s.i.g. while being heated from room temperature to 201° C. over a period of 55 minutes. The mold was cooled and removed from the press yielding a clear orange bar having excellent physical properties.

Example XIII

Six parts of polyacrylonitrile were mixed with 3.2 parts of acrylonitrile and 0.05 part of t-butyl peroxypivalate. The powder was compressed under 5,000 p.s.i.g. in a preheated press and reached a temperature of 91° C. within 10 minutes. The mold was then removed and cooled. The molded bar obtained was transparent and had excellent physical properties.

Example XIV

Polyacrylonitrile was prepared in an aqueous suspension by employing the following recipe:

| | Parts |
|---|---|
| Acrylonitrile | 100 |
| Water | 200 |
| Azobisisobutyronitrile | 0.5 |
| t-Dodecyl mercaptan | 1.2 |
| Polyvinyl pyrrolidone | 0.25 |

The polymerization was carried out for six hours with continuous stirring at 50° C. in a nitrogen atmosphere. The resulting slurry was separated by centrifugation, washed thoroughly with water and dried at 70° C. at reduced pressure.

A mixture of 5 parts by weight of the foregoing polymer, 4 parts by weight of acrylonitrile monomer and 0.05 part by weight of azobisisobutyronitrile was compression molded for 30 minutes at 6,000 p.s.i.g. at a mold temperature of 134° C. A clear transparent bar was produced which had a heat distortion temperature of 84° C., a flexural strength of $4.13 \times 10^3$ p.s.i., a flexural modulus of $6.67 \times 10^5$ p.s.i., a tensile strength of $3.98 \times 10^3$ p.s.i., and a Rockwell hardness of 104.

Example XV

A bulk polyacrylonitrile was prepared as follows: 1150 mls. (926 g. or 100 parts by weight) of acrylonitrile, 13.8 g. (1.49 parts by weight) of t-dodecyl mercaptan and 2.0 g. (0.216 part by weight) of azobisisobutyronitrile were stirred under nitrogen in a reactor which was connected to a filter via a pump in such a way that the precipitated polymer was removed as it formed in the monomer. The reactor was heated in a water bath at 60° C. A total of 52 g. of polyacrylonitrile was prepared in 24 minutes. The polymer, which had an average molecular weight of 168,000 and a distribution (weight average to number average) of 2.71, was used in the following procedure.

A molded bar was prepared according to the procedure of Example XIV using the above-described bulk polymerized polyacrylonitrile. The bar was found to have a heat distortion temperature of 85° C., a flexural strength of $3.98 \times 10^3$ p.s.i., a flexural modulus of $6.24 \times 10^5$ p.s.i., a tensile strength of $3.82 \times 10^3$ p.s.i. and a Rockwell hardness of 104.

Example XVI

Similar results were obtained when the procedure of Example XV was repeated using a mold pressure of 2,000 p.s.i.g. and a final mold temperature of 93° C.

I claim:
1. A process for preparing a solid article consisting essentially of heating a compressed polymerizable mixture consisting essentially of about 20 to 500 parts by weight of acrylonitrile monomer and 100 parts by weight of an acrylonitrile polymer, said polymer being prepared from a monomer mixture of at least 70 percent by weight acrylonitrile and up to 30 percent by weight of butanediol-1,4-divinyl ether at a temperature of from about 50° C. to about 300° C. at a pressure of at least about 1000 p.s.i.g.

2. The process of claim 1 wherein there is included in the polymerizable mixture from 0.01 to 10 parts by weight of a polymerization initiator per 100 parts by weight of acrylonitrile monomer.

3. The process of claim 2 wherein the acrylonitrile polymer is polyacrylonitrile.

4. The process of claim 2 wherein the acrylonitrile polymer is a copolymer of acrylonitrile and butanediol-1, 4-divinyl ether.

References Cited

UNITED STATES PATENTS

| | | | |
|---|---|---|---|
| 2,101,107 | 12/1937 | Strain | 260—885 |
| 2,120,006 | 6/1938 | Strain | 260—885 |
| 3,345,350 | 10/1967 | Shavit et al. | 260—88.7 |
| 2,369,057 | 2/1945 | Leary et al. | 260—885 |
| 2,972,170 | 2/1961 | Birckhead et al. | 264—331 |
| 3,296,228 | 1/1967 | Squire | 260—82.3 |

FOREIGN PATENTS 964,533  7/1964  Great Britain.

MURRAY TILLMAN, *Primary Examiner.*

J. T. GOOLKASIAN, *Assistant Examiner.*